(12) United States Patent
Takahashi et al.

(10) Patent No.: US 11,008,902 B2
(45) Date of Patent: May 18, 2021

(54) VALVE TIMING ADJUSTMENT DEVICE, AND CONTROL DEVICE AND CONTROL METHOD FOR VALVE TIMING ADJUSTMENT DEVICE

(71) Applicant: DENSO CORPORATION, Kariya (JP)

(72) Inventors: Hiroki Takahashi, Kariya (JP); Kenji Tada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/781,020

(22) Filed: Feb. 4, 2020

(65) Prior Publication Data
US 2020/0256219 A1 Aug. 13, 2020

(30) Foreign Application Priority Data
Feb. 12, 2019 (JP) .............................. JP2019-022297

(51) Int. Cl.
*F01L 1/34* (2006.01)
*F01L 1/344* (2006.01)
*F02D 13/02* (2006.01)

(52) U.S. Cl.
CPC .......... *F01L 1/344* (2013.01); *F02D 13/0219* (2013.01); *F01L 2201/00* (2013.01); *F01L 2800/01* (2013.01)

(58) Field of Classification Search
CPC ....... F01L 1/344; F01L 1/352; F01L 2800/01; F01L 2201/00; F01L 2800/05; F01L 2810/02; F01L 2250/02; F01L 2820/044; F02D 13/0219; F02N 19/004; F02N 2200/024

See application file for complete search history.

(56) References Cited

U.S. PATENT DOCUMENTS

| | | | |
|---|---|---|---|
| 2015/0059519 A1 | 3/2015 | Brenner | |
| 2015/0075475 A1 | 3/2015 | Kawada et al. | |
| 2016/0108840 A1* | 4/2016 | Kobayashi | F02D 41/0225 123/90.17 |
| 2018/0306070 A1 | 10/2018 | Mukaide et al. | |

* cited by examiner

*Primary Examiner* — Zelalem Eshete
(74) *Attorney, Agent, or Firm* — Nixon & Vanderhye P.C.

(57) ABSTRACT

A valve timing adjustment device having a phase adjustment unit including an input rotator, a driving rotator that rotates in conjunction with a crankshaft, a driven rotator that rotates in conjunction with a camshaft that changes a relative rotation phase between the driving rotator and the driven rotator. A controller is configured to perform a startup phase control when operation of the internal combustion engine is started, the startup phase control including setting the relative rotation phase to a predetermined initial phase, and perform a startup preparation control during a period after the internal combustion engine is stopped and before the startup phase control is performed, the startup preparation control including changing the relative rotation phase.

11 Claims, 11 Drawing Sheets

VALVE TIMING ADJUSTMENT DEVICE, AND CONTROL DEVICE AND CONTROL METHOD FOR VALVE TIMING ADJUSTMENT DEVICE

This application claims priority to JP Patent Application No. 2019-022297 filed 12 Feb. 2019, the entire contents of which is hereby incorporated by reference.

TECHNICAL FIELD

The present disclosure relates to a valve timing adjustment device.

BACKGROUND

An internal combustion engine may include a valve timing adjustment device that adjusts the rotation phase of a camshaft relative to a crankshaft to adjust the opening and closing timings of a valve.

SUMMARY

In one aspect, a valve timing adjustment device for an internal combustion engine that adjusts opening and closing timings of a valve which is opened and closed by a camshaft driven by torque transmitted from a crankshaft is proposed. The valve timing adjustment device of this embodiment includes a phase adjustment unit including an input rotator, a driving rotator that rotates in conjunction with the crankshaft, a driven rotator that rotates in conjunction with the camshaft, and a speed reduction mechanism that connects each of the driving rotator and the driven rotator to the input rotator so as to be rotatable relative to the input rotator, the speed reduction mechanism being configured to change a relative rotation phase between the driving rotator and the driven rotator in accordance with a rotation of the input rotator, an actuator configured to rotate the input rotator, and a controller that controls rotation of the actuator to control the relative rotation phase. The controller is configured to perform a startup phase control when operation of the internal combustion engine is started, the startup phase control including setting the relative rotation phase to a predetermined initial phase, and perform a startup preparation control during a period after the internal combustion engine is stopped and before the startup phase control is performed, the startup preparation control including changing the relative rotation phase.

DETAILED DESCRIPTION

1. First Embodiment

Figure 1:
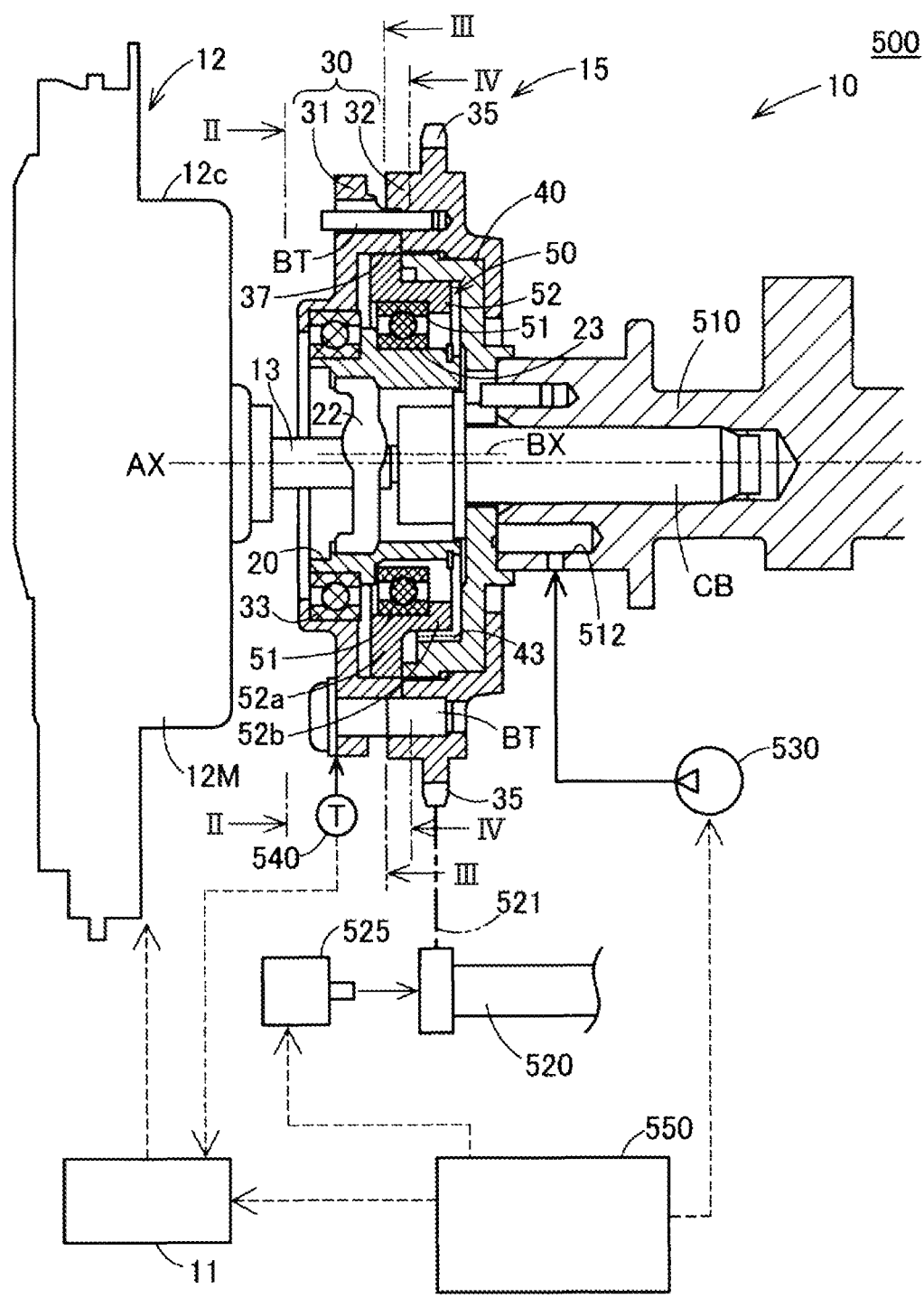
FIG. 1 is a schematic cross-sectional view showing a configuration of a valve timing adjustment device according to a first embodiment.

Referring to FIG. 1, a valve timing adjustment device 10 of a first embodiment is applied to an internal combustion engine 500 that generates a driving force for a vehicle. In the internal combustion engine 500, an intake valve (not shown) is opened and closed by the rotation of a camshaft 510. The camshaft 510 rotates when torque is transmitted from a crankshaft 520. In other words, the camshaft 510 is a driven shaft and the crankshaft 520 is a driving shaft. The valve timing adjustment device 10 is connected to the camshaft 510 and the crankshaft 520. During the operation of the internal combustion engine 500, the valve timing adjustment device 10 adjusts the opening and closing timing of the valve by changing the rotation phase of the camshaft 510 with respect to the rotation phase of the crankshaft 520. Here, in the present specification, the phrase "operation of the internal combustion engine 500" refers to continuous combustion in a combustion chamber of the internal combustion engine 500 to generate torque.

The valve timing adjustment device 10 includes a controller 11 that is a hardware control device, an actuator 12 that is a source of driving force, and a phase adjustment unit 15 that is a gear unit. The controller 11 is a microcontroller including a processor and a storage device, e.g., a memory have computer programs stored thereon that when executed by the processor cause the processor to perform various functions described herein. The controller 11 controls the operation of the valve timing adjustment device 10 in accordance with commands from an ECU (Electronic Control Unit) 550 that controls the operation of the internal combustion engine 500.

During the operation of the internal combustion engine 500, the controller 11 controls the operation of the actuator 12 to control a relative rotation phase which is described later. As a result, the valve timing adjustment device 10 is able to control the operation of adjusting the opening and closing timing of the intake valve. In the first embodiment, when starting the operation of the internal combustion engine 500, the controller 11 executes a startup processing which includes a startup preparation control and a startup phase control. The startup processing, the startup preparation control, and the startup phase control will be described later. It should be noted that at least some of the functions of the controller 11 may be implemented as a hardware circuit, i.e., logic circuitry. Further alternatively, the controller 11 may be implemented as a part of the ECU 550.

The actuator 12 is a device that generates a driving force for changing the rotation phase of the camshaft 510 relative to the crankshaft 520. The actuator 12 may be a DC brushless motor, for example. The actuator 12 is housed in a casing 12c. The actuator 12 includes a main body 12M that generates a rotational driving force. The main body 12M includes an electromagnetic coil, a stator, and a rotor. The actuator 12 also includes a driving rotating shaft 13 connected to the rotor. In the first embodiment, the actuator 12 is configured such that only the driving rotating shaft 13, which transmits torque, is connected to the phase adjustment unit 15. Meanwhile, the main body 12M is disposed at a position separate from the phase adjustment unit 15.

The driving rotating shaft 13 is supported by the casing 12c so as to be rotatable forward and backward. The driving rotating shaft 13 is connected to the phase adjustment unit 15 at a tip portion of the driving rotating shaft 13 that protrudes from the casing 12c. The central axis of the driving rotating shaft 13 coincides with a rotation axis AX of the camshaft 510. The actuator 12 further includes an energization control unit (not shown) provided in the casing 12c. The energization control unit includes components such as a drive unit and a microcontroller for controlling the drive unit. The energization control unit is under the command of the controller 11 and controls the energization of the stator in the actuator 12 to control the rotation of the driving rotating shaft 13.

The phase adjustment unit 15 is a device that changes the rotation phase of the camshaft 510 with respect to the crankshaft 520 using the driving force of the actuator 12. The phase adjustment unit 15 includes an input rotator 20 connected to the actuator 12, a driving rotator 30 that rotates in conjunction with the crankshaft 520, and a driven rotator 40 that rotates in conjunction with the camshaft 510. The phase adjustment unit 15 further includes a reduction mechanism 50 that reduces the rotation speed from the input rotator 20.

Figure 2:
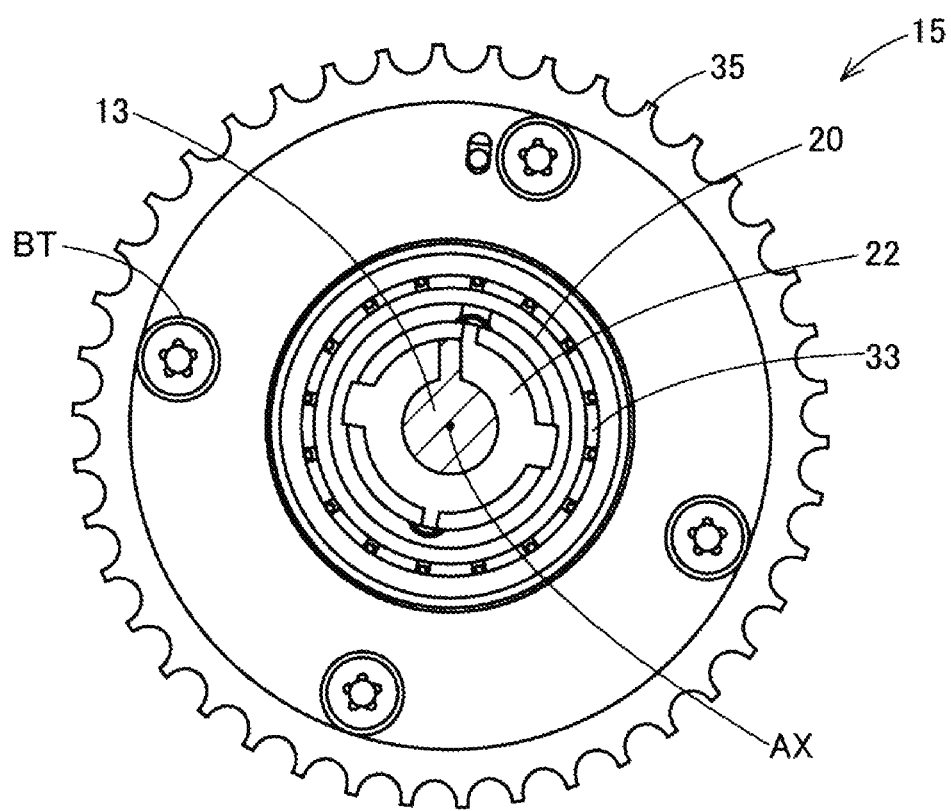
FIG. 2 is a schematic cross-sectional view of the valve timing adjustment device taken along line 2-2 shown in FIG. 1.

Next, referring to FIGS. 1 and 2, the input rotator 20 has a substantially cylindrical shape, and the driving rotating shaft 13 of the actuator 12 is inserted in the input rotator 20. The driving rotating shaft 13 is connected to the inner peripheral wall surface of the input rotator 20 via a connecting member 22 fitted to the outer periphery of the driving rotating shaft 13. As a result, the input rotator 20 rotates together with the driving rotating shaft 13 of the actuator 12.

Figure 3:
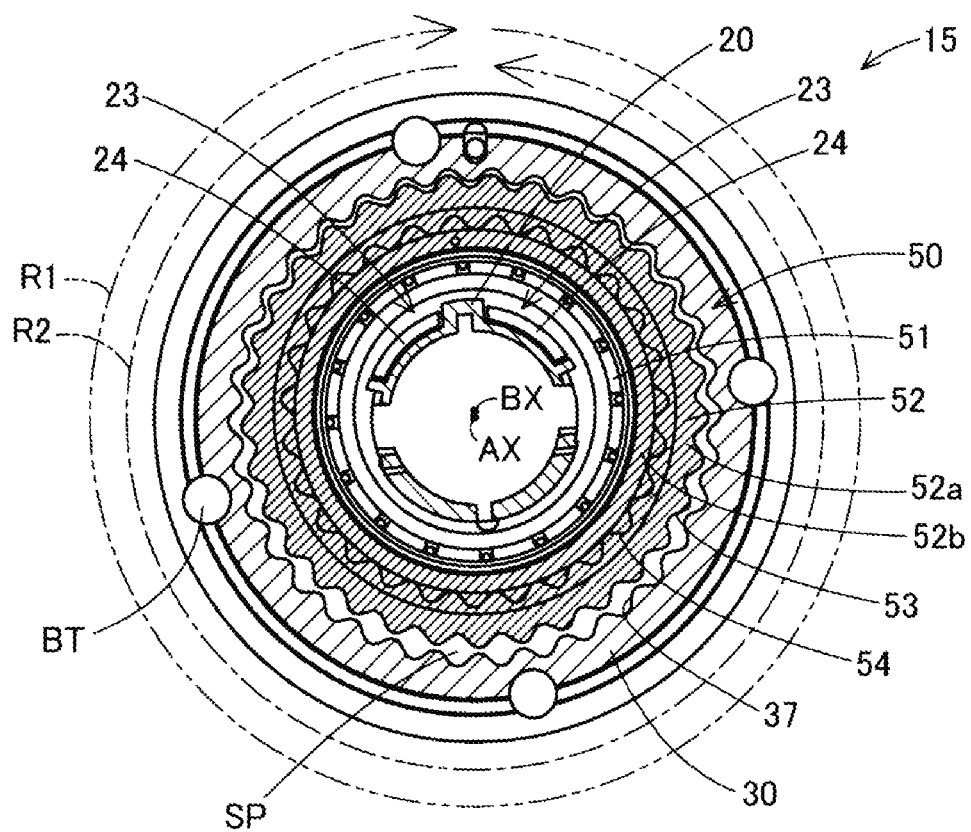
FIG. 3 is a schematic cross-sectional view of a phase adjustment unit taken along line 3-3 shown in FIG. 1.

Next, referring to FIGS. 1 and 3, in the first embodiment, the input rotator 20 includes an eccentric portion 23. In addition, the speed reduction mechanism 50 includes a planetary gear 52. The eccentric portion 23 engages the planetary gear 52 to cause a revolving (orbital) motion in the planetary gear 52. The center axis of the eccentric portion 23 is an eccentric axis BX. The eccentric axis BX is offset to one side in a radial direction with respect to the rotation axis AX. Here, the radial direction is perpendicular to the rotation axis AX. The eccentric portion 23 includes a pair of recessed portions that are arranged along the circumferential direction around the rotation axis AX. This pair of recessed portions open outward in the radial direction. Each recessed portion houses an elastic member 24 that generates a restoring force. The elastic members 24 may be, for example, a metal leaf spring with a substantially U-shaped cross section. The planetary gear 52 is biased by the elastic members 24 of the eccentric portion 23 toward the driving rotator 30 and the driven rotator 40.

Next, referring to FIGS. 1 and 2, the driving rotator 30 has a substantially cylindrical shape and forms the outermost peripheral portion of the phase adjustment unit 15. As such, the input rotator 20, the driven rotator 40, and the speed reduction mechanism 50 are all accommodated within the driving rotator 30. The driving rotator 30 includes a first member 31 disposed closer toward the actuator 12 and a second member 32 disposed closer toward the camshaft 510. The driving rotator 30 is configured such that the first member 31 and the second member 32 are integrally fastened together by a plurality of bolts BT. The input rotator 20 is supported via a bearing 33 so as to be rotatable about the rotation axis AX inside the first member 31.

A sprocket 35 is formed on the outer periphery of the second member 32. The driving rotator 30 and the crankshaft 520 are connected together by an annular endless timing chain 521 that extends between the sprocket 35 and the crankshaft 520. In FIG. 1, for convenience, the timing chain 521 is illustrated by a two-dot chain line. In the internal combustion engine 500, the torque of the crankshaft 520 is transmitted to the sprocket 35 through the timing chain 521, and the driving rotator 30 rotates in conjunction with the crankshaft 520. Further, although detailed descriptions and illustrations are omitted, the driving rotator 30 includes a signal plate that is a disk-like member. This signal plate allows the controller 11 to detect the rotation angle of the driving rotator 30. The signal plate is attached to the driving rotator 30 such that the signal plate is rotatable together with the driving rotator 30.

Referring to FIG. 1, the driven rotator 40 has a cylindrical shape with a bottom and is accommodated inside the second member 32. The driven rotator 40 is arranged in the second member 32 such that the central axis of the driven rotator 40 coincides with the rotation axis AX of the camshaft 510. In addition, the driven rotator 40 is disposed to open toward the first member 31 of the driving rotator 30. The driven rotator 40 is assembled so as to be rotatable relative to the driving rotator 30 about the rotation axis AX. The driven rotator 40 is fixed to the end of the camshaft 510 by a center bolt CB passing through a bottom wall portion facing the camshaft 510. Here, the term "bottom wall" refers to the end face portion of the cylindrical shape of the driven rotator 40, rather than referring to wall portions in the top/bottom direction. As a result, the driven rotator 40 rotates in conjunction with the camshaft 510.

Figure 4:
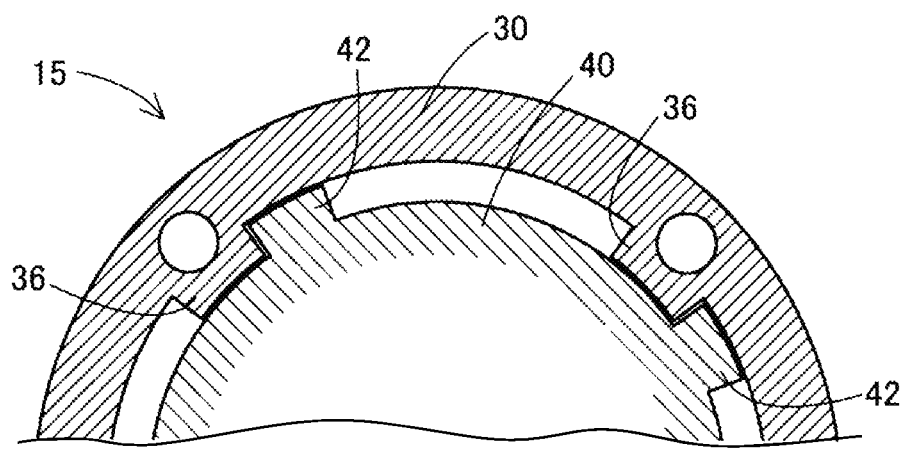
FIG. 4 is a schematic cross-sectional view of a driving rotator and a driven rotator taken along line 4-4 shown in FIG. 1.

Referring to FIG. 4, a plurality of engaging portions 36 are arranged at equal intervals on the inner peripheral surface of the second member 32 of the driving rotator 30. The plurality of engaging portions 36 are inward teeth protruding radially toward the outer peripheral surface of the driven rotator 40. As one example, four such engaging portions 36 may be provided. In addition, a plurality of engaged portions 42 are arranged at equal intervals on the outer peripheral surface of the driven rotator 40. The plurality of engaged portions 42 are outward teeth protruding in the radial direction toward the inner peripheral surface of the second member 32 of the driving rotator 30. The plurality of engaged portions 42 are arranged such that each engaged portion 42 is interposed between adjacent ones of the engaging portions 36 of the driving rotator 30. As one example, four such engaged portions 42 may be provided.

When the engaging portion 36 of the driving rotator 30 and the engaged portion 42 of the driven rotator 40 are not in contact with each other, relative rotation between the driving rotator 30 and the driven rotator 40 is allowed. Conversely, when the engaging portion 36 of the driving rotator 30 and the engaged portion 42 of the driven rotator 40 are in contact with each other, relative rotation between the driving rotator 30 and the driven rotator 40 is restricted.

As a result, the driving rotator 30 and the driven rotator 40 rotate together. In the phase adjustment unit 15, a most-retarded angle and a most-advanced angle of the relative rotation phase between the driving rotator 30 and the driven rotator 40 are defined by the arrangement pitch of the engaging portions 36 and the engaged portions 42. It should be noted that the relative rotation phase between the driving rotator 30 and the driven rotator 40 is also the relative rotation phase between the crankshaft 520 and the camshaft 510.

Next, referring to FIGS. 1 and 2, the speed reduction mechanism 50 connects the driving rotator 30 and the driven rotator 40 so as to be rotatable relative to the input rotator 20. The speed reduction mechanism 50 is configured to change the relative rotation phase between the driving rotator 30 and the driven rotator 40 in accordance with the rotation of the input rotator 20. In the first embodiment, the speed reduction mechanism 50 is a 2K-H type planetary gear mechanism. The speed reduction mechanism 50 includes the eccentric portion 23 provided in the input rotator 20 that functions as an input shaft, a driving-side inward gear portion 37 provided in the driving rotator 30, a driven-side inward gear portion 43 provided in the driven rotator 40, a planetary bearing 51, and a planetary gear 52.

Next, referring to FIGS. 1 and 2, the drive side inward gear portion 37 is provided on the inner peripheral side wall surface of the first member 31. The central axis of the drive side inward gear portion 37 coincides with the rotation axis AX of the camshaft 510. The driven side inward gear portion 43 is provided on the inner wall of the driven rotator 40. Specifically, referring to FIG. 1, the driven side inward gear portion 43 is provided on the inner peripheral side wall surface of the driven rotator 40. The central axis of the driven side inward gear portion 43 coincides with the rotation axis AX of the camshaft 510. The diameter of the driven side inward gear portion 43 is set to be smaller than the diameter of the drive side inward gear portion 37. Further, the number of teeth of the driven side inward gear portion 43 is set to be smaller than the number of teeth of the drive side inward gear portion 37.

As shown in FIG. 3, the planetary bearing 51 surrounds the outer periphery of the input rotator 20. The planetary bearing 51 is disposed outward of the eccentric portion 23 of the input rotator 20 with a predetermined clearance. The planetary bearing 51 transmits the force received from each elastic member 24 of the eccentric portion 23 to the planetary gear 52.

As shown in FIGS. 1 and 3, the planetary gear 52 has a stepped cylindrical shape. The planetary gear 52 includes a large diameter portion 52a closer toward the actuator 12 and a small diameter portion 52b closer toward the camshaft 510 with respect to the axial direction. The diameter of the large diameter portion 52a is larger than that of the small diameter portion 52b. As shown in FIG. 3, the large diameter portion 52a of the planetary gear 52 include a driving-side outward gear portion 53 in which outward facing teeth are arranged to mesh with the driving-side inward gear portion 37 provided in the driving rotator 30. The small-diameter portion 52b of the planetary gear 52 has a driven-side outward gear portion 54 in which outward facing teeth are arranged to mesh with the driven-side inward gear portion 43 provided on the driven rotator 40. When the input rotator 20 rotates about the rotation axis AX, the planetary gear 52 performs a planetary motion that revolves around the rotation axis AX while rotating about the eccentric axis BX. At this time, the rotation speed of the planetary gear 52 is reduced with respect to the rotation speed of the input rotator 20.

Next, the phase adjustment unit 15 changing the relative rotation phase caused by controlling the actuator 12 will be described. When the controller 11 controls the driving rotating shaft 13 of the actuator 12 to rotate at the same speed as the driving rotator 30 and does not control the input rotator 20 to rotate relative to the driving rotator 30, the planetary gear 52 is driven without planetary motion. As a result, the driving rotator 30 and the driven rotator 40 are rotated together. Therefore, the relative rotation phase between the driving rotator 30 and the driven rotator 40 is maintained at a constant value without change.

In contrast, when the controller 11 controls the driving rotating shaft 13 of the actuator 12 to rotate at a lower speed or rotate in reverse with respect to the driving rotator 30 and controls the input rotator 20 to rotate relative to the driving rotator 30 in the retard direction, the planetary gear 52 moves in a planetary motion. As a result, the driven rotator 40 rotates relative to the driving rotator 30 in the retard direction. Therefore, the relative rotation phase between the driving rotator 30 and the driven rotator 40 changes to the retard side.

Further, when the controller 11 controls the driving rotating shaft 13 of the actuator 12 to rotate at a higher speed with respect to the driving rotator 30 and controls the input rotator 20 to rotate relative to the driving rotator 30 in the advance direction, the planetary gear 52 moves in a planetary motion. As a result, the driven rotator 40 rotates relative to the driving rotator 30 in the advance direction. Therefore, the relative rotation phase between the driving rotator 30 and the driven rotator 40 changes to the advance side.

Referring to FIG. 1, during operation of the internal combustion engine 500, the phase adjustment unit 15 of the valve timing adjustment device 10 is filled with lubricating oil for facilitating the operation of the various elements 20, 30, 40, and 50. When the operation of the internal combustion engine 500 is started, the lubricating oil is supplied to the phase adjustment unit 15 by a pump 530 that is driven under the control of the ECU 550. This lubricating oil is supplied through a supply path 512 provided in the camshaft 510 and fills the internal space of the driving rotator 30 in which the input rotator 20, the driven rotator 40 and the speed reduction mechanism 50 are accommodated. As the various rotating elements in the phase adjustment unit 15 rotates, the lubricating oil in the phase adjustment unit 15 is discharged to outside through a discharge path (not shown) provided in the phase adjustment unit 15. The discharged lubricating oil is stored in an oil pan (not shown). Then, by operating the pump 530, the lubricating oil is recirculated into the phase adjustment unit 15 through the supply path 512. Since the pump 530 is stopped after the operation of the internal combustion engine 500 is stopped, the operation of the phase adjustment unit 15 is stopped while the phase adjustment unit 15 is filled with the lubricating oil.

In addition, the valve timing adjustment device 10 includes a temperature detection unit 540 that detects the temperature of the valve timing adjustment device 10. The temperature detection unit 540 may be a temperature sensor, for example. The temperature detection unit 540 is installed on the outside of the valve timing adjustment device 10. Alternatively, the temperature detection unit 540 may be installed at a position exposed to the lubricating oil inside the valve timing adjustment device 10. Further alternatively, the temperature detection unit 540 may detect the temperature of a refrigerant after the refrigerant has exchanged heat with the valve timing adjustment device 10. The controller 11 uses the detection result of the temperature detection part 540 in the startup processing explained below.

Figure 5:
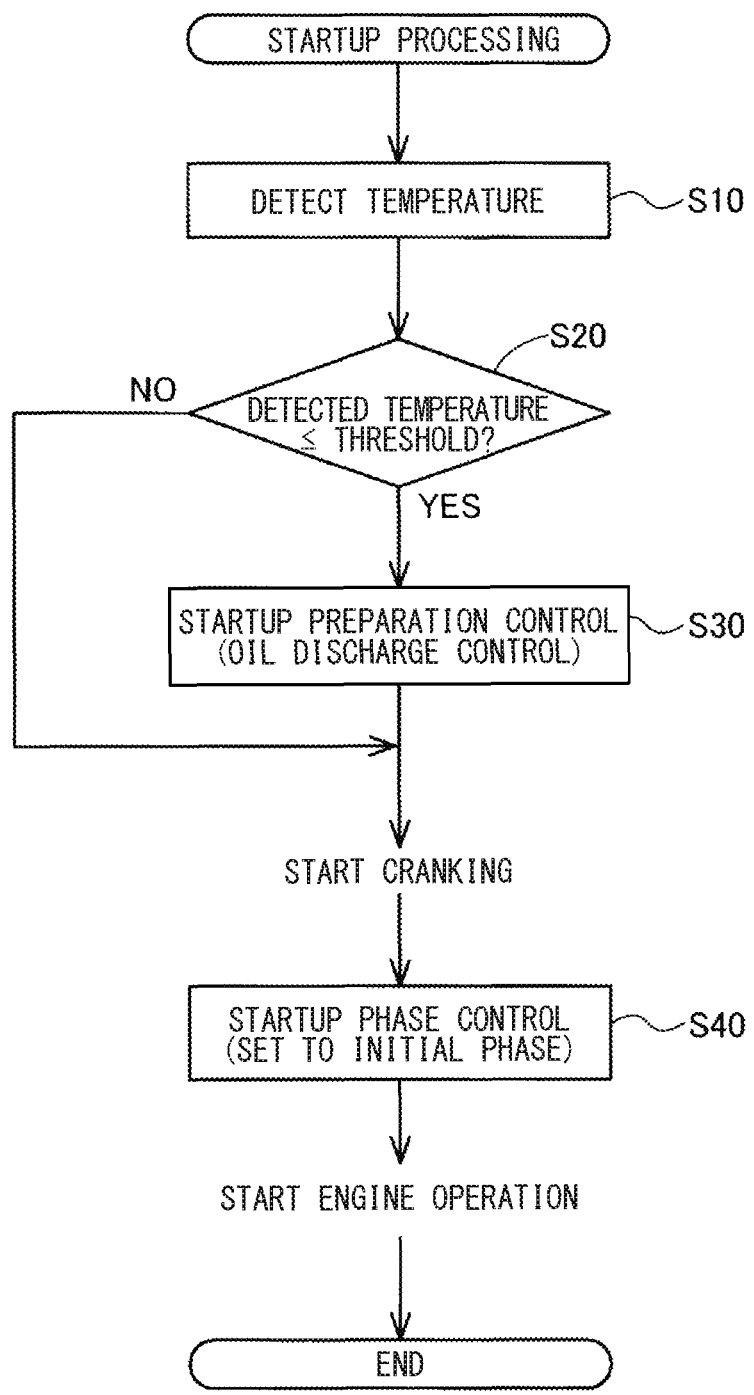
FIG. 5 is an explanatory diagram showing a flowchart of a startup processing according to the first embodiment.
Figure 6:
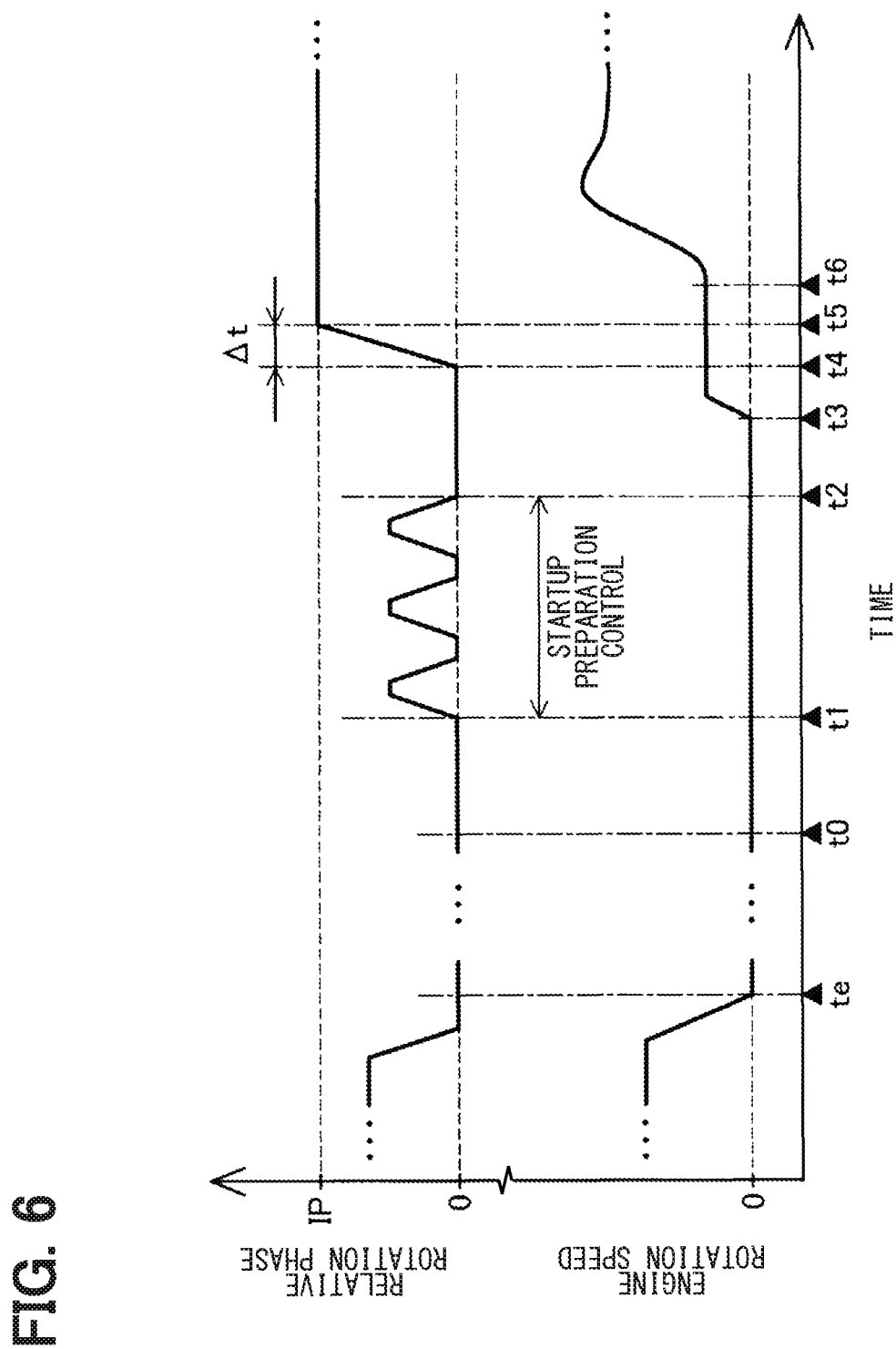
FIG. 6 is an explanatory diagram showing an example of a timing chart when the startup processing of the first embodiment is executed.

With reference to the flowchart of FIG. 5 and the timing chart of FIG. 6, the startup processing of the first embodiment executed by the valve timing adjustment device 10 will be described. This startup processing is performed when the operation of the internal combustion engine 500 is started up. The upper section of FIG. 6 shows change over time in the relative rotation phase between the driving rotator 30 linked to the crankshaft 520 and the driven rotator 40 linked to the camshaft 510. The lower section of FIG. 6 shows change over time in the rotation speed of the internal combustion engine 500. In FIG. 6, a value of 0 for the relative rotation phase is defined as when the relative rotation phase is at the most-retarded angle. Further, an increase in the relative rotation phase indicates that the relative rotation phase is advanced. In addition, a decrease in the relative rotation phase indicates that the relative rotation phase is retarded.

The startup processing is started when the driver of the vehicle performs a starting operation of the internal combustion engine 500. FIG. 6 shows that the previous operation of the internal combustion engine 500 was stopped at time te. Then later at time t0, the starting operation of the internal combustion engine 500 by the driver is detected, and at this time, the startup processing begins. In the first embodiment, the controller 11 is configured to control the relative rotation phase to the most-retarded angle when the internal combustion engine 500 is stopped. As a result, at time t0, the relative rotation phase is at the most-retarded angle. It should be noted that in alternative embodiments, the relative rotation phase when the operation of the internal combustion engine 500 is stopped and when the startup processing is started is not necessarily limited to being at the most-retarded angle.

In step S10, the controller 11 detects the current temperature of the valve timing adjustment device 10 using the temperature detection unit 540. It should be noted that the detected temperature of the temperature detection unit 540 can be interpreted as representing the temperature of the lubricating oil in the valve timing adjustment device 10 at this time. In step S20, the controller 11 determines whether or not the temperature detected by the temperature detection unit 540 is equal to or less than a predetermined threshold value. In the first embodiment, the threshold is defined as a determination condition for determining whether or not a cold start is being executed. The threshold value may be, for example, the current outside air temperature or an average outside air temperature during cold weather. When the detected temperature is equal to or lower than the threshold value, the controller 11 executes a startup preparation control in step S30, and when the detected temperature is higher than the threshold value, the controller 11 skips the startup preparation control in step S30.

The startup preparation control is performed so that the valve timing adjustment device 10 can start operating smoothly. In particular, during the startup preparation control, the phase adjustment unit 15 is operated before the internal combustion engine 500 is started in order to execute a control for changing the relative rotation phase. Here, "control for changing the relative rotation phase" means a control process that causes the driven rotator 40 to rotate relative to the driving rotator 30 in at least one of the advance angle direction and the retard angle direction. In other words, "control for changing the relative rotation phase" refers to a control process that causes the rotators inside the phase adjustment unit 15 to rotate relative to each other. The startup preparation control of the first embodiment is executed before the cranking operation of the internal combustion engine 500 is started. When the rotators in the phase adjustment unit 15 are rotated during the startup preparation control, the lubricating oil in the phase adjustment unit 15 is discharged to an extent. During a cold start, this lubricating oil tends to be low in temperature and high in viscosity resistance. As a result of the discharging effect, the viscosity resistance inside the phase adjustment unit 15 may be reduced, and the subsequent operation of the phase adjustment unit 15 can be smoothly performed. The startup preparation control can be interpreted as an oil discharge control that causes lubricating oil to be discharged from the phase adjustment unit 15.

In FIG. 6, the startup preparation control is executed during the period from time t1 to time t2. In the startup preparation control of the first embodiment, the controller 11 alternately performs an advance angle operation that causes the actuator 12 to rotate forward at a high speed to advance the relative rotation phase, and a retard angle operation that causes the actuator 12 to rotate at a low speed or rotate in reverse. In the first embodiment, the controller 11 repeatedly performs the above described advance angle operation and retard angle operation, in this order, i.e., alternately. In the example of FIG. 6, the controller 11 repeatedly controls the relative rotation angle to change from the most-retarded angle to an advanced angle, and then to return to the most-retarded angle. In this regard, by performing both the advance angle operation and the retard angle operation, the lubricating oil can be more effectively discharged as compared to the case of performing only the advance angle operation or performing only the retard angle operation. As a result, it is possible to reduce the likelihood of the lubricating oil stagnating within the phase adjustment unit 15. Further, the advance angle operation and the retard angle operation are alternately performed a plurality of times, so that the lubricating oil in the phase adjustment unit 15 can be discharged more effectively.

Referring to FIG. 3, in the first embodiment, as described above, the speed reduction mechanism 50 is a planetary gear mechanism including the planetary gear 52. In this case, the startup preparation control preferably further includes controlling the planetary gear 52 to perform at least one full revolution. That is, the startup preparation control preferably further includes controlling the eccentric shaft center BX to make a full revolution around the rotation axis AX. If this is done, the lubricating oil in the speed reduction mechanism 50 may also be discharged effectively. Specifically, lubricating oil tends to build up in spaces SP formed between the teeth of the planetary gear 52 and the teeth of the driving rotator 30 and the driven rotator 40. See FIG. 3 for an example of a space SP that forms when these teeth are not meshed with each other. When the planetary gear 52 is controlled to make a full revolution, the lubricating oil in these spaces SP may be effectively forced out. As a result, the viscosity resistance in the speed reduction mechanism 50 can be effectively reduced. In the startup preparation control of the first embodiment, in order to ensure that lubricating oil in the spaces SP is discharged, the planetary gear 52 is controlled to make two full rotations. Specifically, as shown by the arrows R1, R2 in FIG. 3, the planetary gear 52 is controlled to make one full revolution towards the advance side, and then make one full revolution to the retard side.

It should be noted that the startup preparation control is not limited to a configuration in which the advance angle operation and the retard angle operation as described above are alternately repeated a plurality of times. In alternative embodiments, the startup preparation control include performing the advance angle operation and the retard angle operation only once each, or may include performing only the advance angle operation. Further alternatively, in the case where the relative rotation phase at the start of execution of the startup processing of the internal combustion engine 500 is not the most-retarded angle, the advance angle operation and the retard angle operation may be executed alternately in the reverse order, or only the retard angle operation may be performed. In other words, as long as either the advance angle operation or the retard angle operation is performed at least once, the lubricating oil can be discharged to some extent. In the startup preparation control, the amount advanced by the advance angle operation and the amount retarded by the retard angle operation may be different from each other as well.

Next, referring back to FIGS. 5 and 6, after executing the startup preparation control in step S30, ECU 550 starts a cranking operation in order to start operation of internal combustion engine 500. Specifically, ECU 550 drives a starter motor 525 provided in internal combustion engine 500 and starts rotation of crankshaft 520 using the driving force from the starter motor 525. In FIG. 6, the cranking operation is started at time t3. In the first embodiment, prior to the start of the cranking operation, a predetermined relative rotation phase for starting the cranking operation is set by the startup preparation control. In the first embodiment, the relative rotation phase for starting the cranking operation is the most-retarded angle. If the relative rotation phase is set to the most-retarded angle at the start of the cranking operation, the load on the starter motor 525 from the valve timing adjustment device 10 is minimized. As a result, the cranking operation may be smoothly started. It should be noted that the relative rotation phase at the time of starting the cranking operation is not limited to the most-retarded angle, and may be set to another phase angle in alternative embodiments.

After the cranking operation is started, the controller 11 executes a startup phase control in which the relative rotation phase is set to an initial phase IP in step S40. In the first embodiment, the startup phase control changes the rotation phase, which was previously set at the time of starting the cranking operation, to the initial phase IP. The initial phase IP is determined in advance, e.g., experimentally, so that the operation start of the internal combustion engine 500 can be smoothly executed. The controller 11 executes the startup phase control in step S40 after a predetermined time has elapsed after the start of the cranking operation. In the first embodiment, the initial phase IP is defined as a phase that provides an appropriate compression ratio when the first combustion occurs in the internal combustion engine 500. Therefore, the controller 11 performs the startup phase control in step S40 before the first combustion occurs. The controller 11 may, for example, execute the startup phase control in step S40 when one compression operation is performed in the internal combustion engine 500 during cranking operation. In an alternative embodiment, the controller 11 may perform the startup phase control after the first combustion of the internal combustion engine 500 by calculating an appropriate initial phase IP based on that first combustion.

In FIG. 6, execution of the startup phase control is started at time t4, and the initial phase IP is set by the controller 11 as a command value for the relative rotation phase with respect to the phase adjustment unit 15. Thereafter, the relative rotation phase reaches the initial phase IP at time t5, and the first combustion occurs in the internal combustion engine 500 at time t6. At this time, the operation of the internal combustion engine 500 is started. In the example of FIG. 6, since the startup preparation control is executed from time t1 to time t2, the viscosity resistance inside the phase adjustment unit 15 is reduced at time t4 when the startup phase control is started. As a result, the time period from the time t4 to the time t5, which is the period when the relative rotation phase is set to the initial phase IP, is shortened compared to the case where the startup preparation control is not executed, and energy consumed in that period is reduced.

To more clearly understand the advantages and technical effects of the embodiments described in this disclosure, a comparison can be made with a comparative example valve timing adjustment device. In particular, consider a comparative device where, when an internal combustion engine is cold-started, the lubricating oil inside a comparative valve timing adjustment device is heated through self-heating by energizing the electromagnetic coil of the drive motor of the comparative valve timing adjustment device. With this configuration, if the drive motor is a brushless DC motor, the drive motor and the gear portion are only connected by a torque transmission component. In such a configuration, even if the electromagnetic coil of the drive motor is heated, it may be difficult to sufficiently transmit the heat to the lubricating oil in the gear portion.

As a result, there is a concern that operation responsiveness may not be sufficient during a cold start due to an increase in viscosity resistance caused by lubricating oil in the gear portions, whose viscosity increases is low temperatures. Such a decrease in operation responsiveness of the valve timing adjustment device may lead to a decrease in the performance of the internal combustion engine.

In contrast, as described above, according to the valve timing adjustment device 10 of the first embodiment, during the startup processing, the startup preparation control which reduces the amount of lubricating oil in the phase adjustment unit 15 is performed before the startup phase control for facilitating the start of the operation of the internal combustion engine 500. Therefore, when the operation of the internal combustion engine 500 is started, the viscosity resistance in the phase adjustment unit 15 may be reduced, especially during cold starts. As a result, the operation responsiveness of the valve timing adjustment device 10 may be improved.

In particular, in the valve timing adjustment device 10 of the first embodiment, the main body 12M that is the driving force generation source of the actuator 12 and the phase adjustment unit 15 are separated from each other. For this reason, it is not easy to raise the temperature of the lubricating oil in the phase adjustment unit 15 by using the driving temperature of the actuator 12. In this regard, according to the valve timing adjustment device 10 of the first embodiment, the viscosity resistance in the phase adjustment unit 15 may be reduced due to the startup preparation control. As a result, it is possible to effectively improve the operation responsiveness of the valve timing adjustment device 10.

According to the valve timing adjustment device 10 of the first embodiment, the startup preparation control is executed in a period after a command to start the internal combustion engine 500 is received and before the cranking operation of the internal combustion engine 500 is started. As a result, during the startup period of the internal combustion engine 500, this time period prior to the cranking operation can be effectively utilized.

According to the valve timing adjustment device 10 of the first embodiment, the startup preparation control is executed when the temperature detected by the temperature detection unit 540 is lower than a predetermined threshold value.

Therefore, the startup preparation control can be effectively executed when the viscosity resistance of the lubricating oil is expected to be relatively high. When the detected temperature is high and the viscosity resistance of the lubricating oil in the phase adjustment unit 15 is expected to be relatively low, the startup preparation control may be skipped. As a result, the start time of the internal combustion engine 500 is not increased due to unnecessarily performing the startup preparation control.

The startup preparation control of the first embodiment includes both an advance angle operation for advancing the relative rotation phase and a retard angle operation for retarding the relative rotation phase. Therefore, the lubricating oil can be more effectively discharged as compared to when only one of these operations is performed. Further, in the startup preparation control of the first embodiment, since the advance angle operation and the retard angle operation are alternately repeated a plurality of times, the lubricating oil can be discharged from the phase adjustment unit 15 more effectively. In addition, since the startup preparation control of the first embodiment includes an operation of rotating the planetary gear 52 for at least one revolution, the lubricating oil present in the spaces SP between the planetary gear 52 and the driving rotator 30 and the driven rotator 40 can be effectively discharged.

2. Second Embodiment

Figure 7:
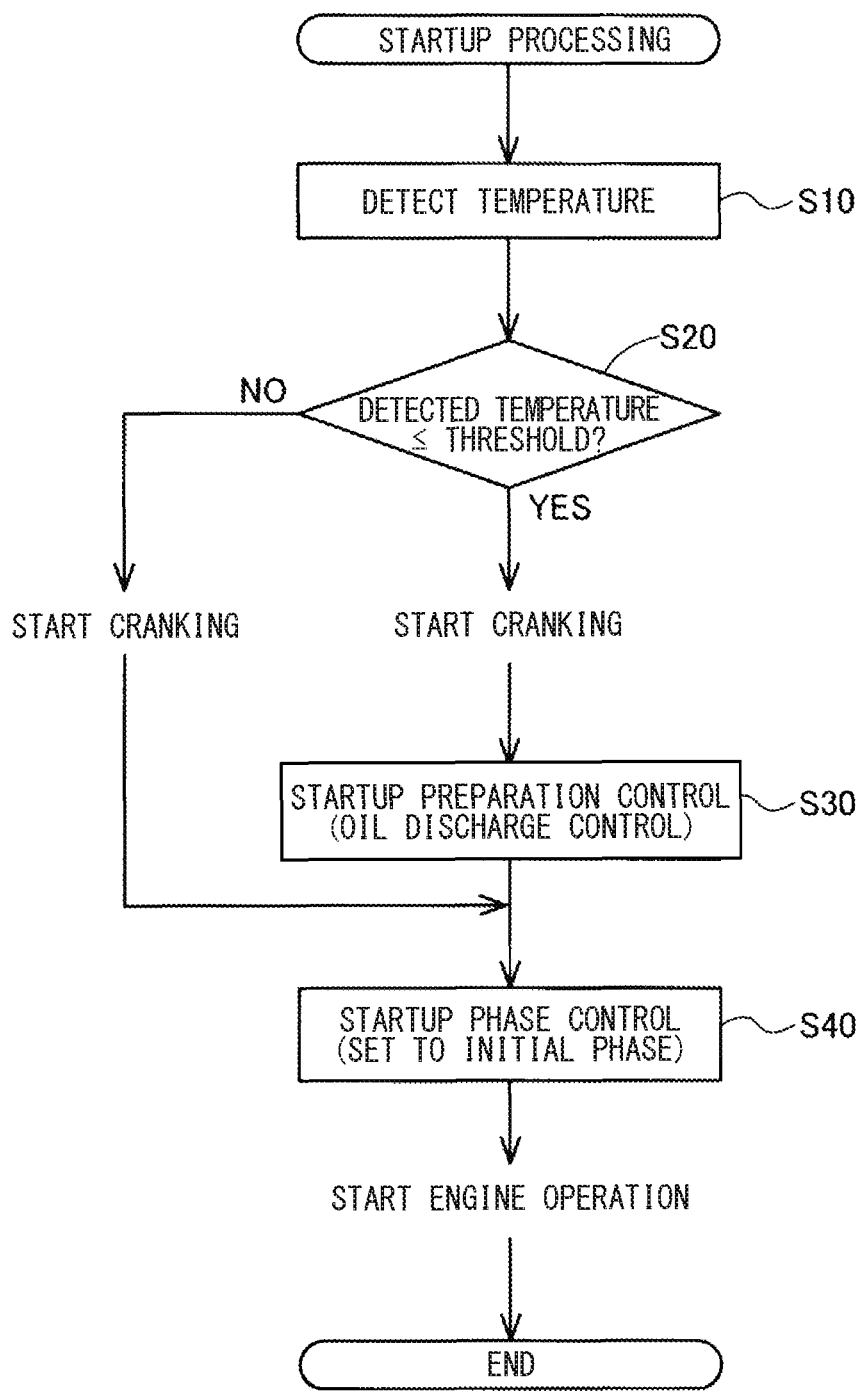
FIG. 7 is an explanatory diagram showing a flowchart of a startup processing according to a second embodiment.

With reference to the flowchart of FIG. 7 and the timing chart of FIG. 8, the flow of a startup processing performed by the valve timing adjustment device of a second embodiment will be described. The configuration of the valve timing adjustment device of the second embodiment is substantially the same as the configuration of the valve timing adjustment device 10 of the first embodiment. The startup processing of the second embodiment is different in that the startup preparation control is executed during the cranking operation of the internal combustion engine 500, not before the start of the cranking operation. Other aspects of the second embodiment are substantially similar to those of the first embodiment.

In the startup processing of the second embodiment, the controller 11 starts the cranking operation when the detected temperature is equal to or lower than the threshold value in step S20. Then, while the cranking operation is being performed, the startup preparation control in step S30 is executed at a predetermined timing. After executing the startup preparation control, the controller 11 executes the startup phase control in which the relative rotation phase is set to the initial phase IP in step S40.

Figure 8:
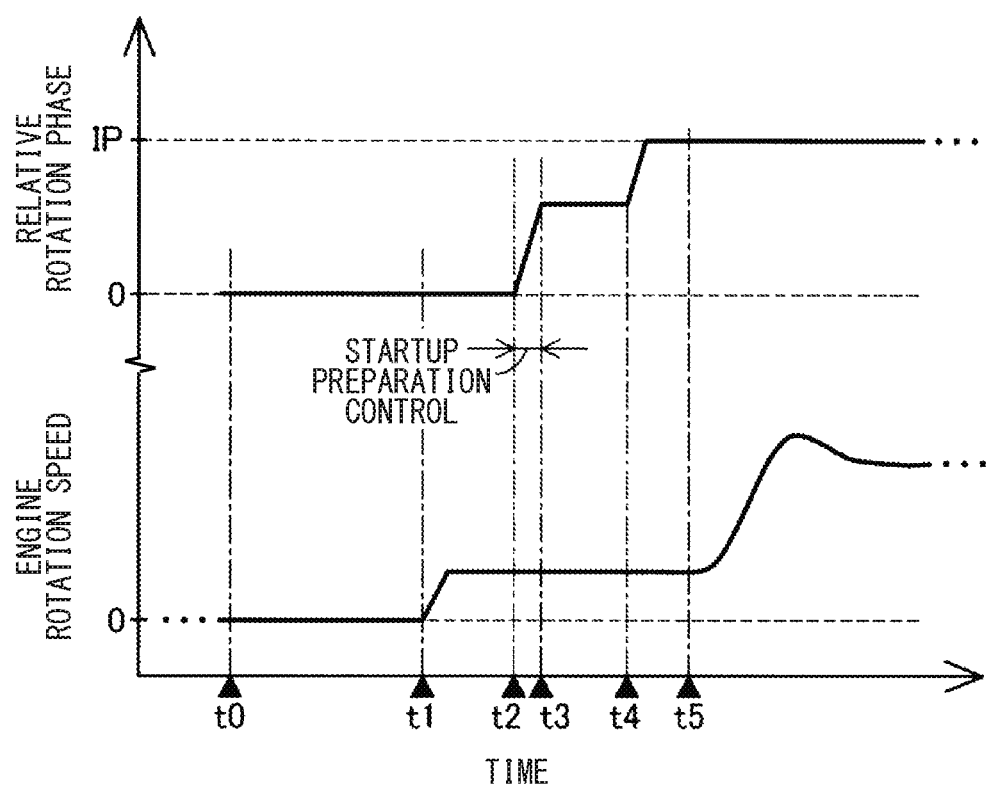
FIG. 8 is an explanatory diagram showing an example of a timing chart when the startup processing of the second embodiment is executed.

In the example of FIG. 8, after a starting operation from the driver is detected at time t0, the cranking operation is started at time t1, the startup preparation control is executed from time t2 to t3, and the startup phase control is executed from time t4 to t5. Control is being executed. In this example, during the startup preparation control, an advance angle operation for advancing the relative rotation phase from the most-retarded angle is performed only once. However, this is not intended to be limiting, and during the startup preparation control, the advance angle operation and the retard angle operation may be performed at least once instead, or the advance angle operation and the retard angle operation may be alternately repeated a plurality of times as in the first embodiment. In addition, the relative rotation phase at the start of execution of the startup processing may not be the most-retarded angle as well. In this case, during the startup preparation control, only the retard angle operation may be executed, or the retard angle operation and the advance angle operation may be executed in this order.

According to the valve timing adjustment apparatus of the second embodiment, after a start command for the internal combustion engine 500 is received, the startup preparation control is executed during the cranking operation. Therefore, the cranking operation and the startup preparation control can be executed in parallel, which is efficient. In addition, according to the valve timing adjustment device and the control method thereof of the second embodiment, various functions and effects similar to those described in the first embodiment can be achieved.

3. Third Embodiment

Figure 9:
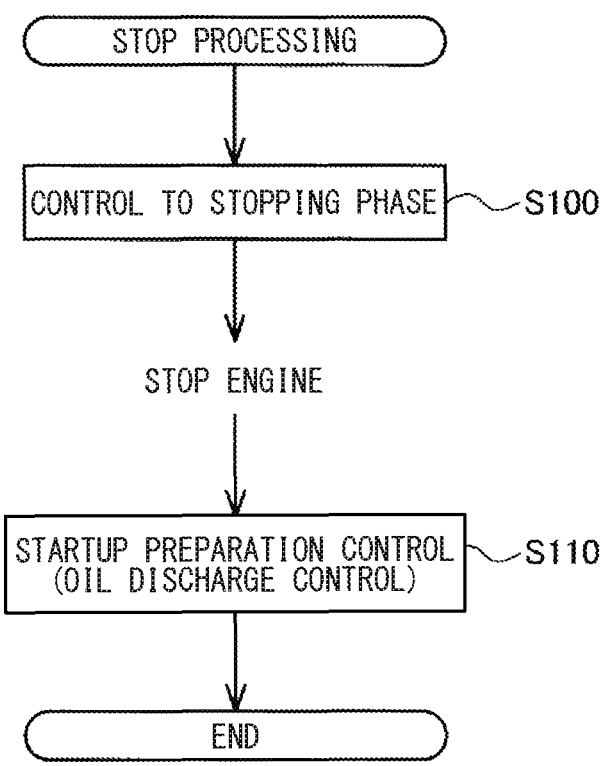
FIG. 9 is an explanatory diagram showing a flowchart of a stop processing according to a third embodiment.

With reference to the flowchart of FIG. 9 and the timing chart of FIG. 10, the flow of a stop processing performed by the valve timing adjustment device of a third embodiment will be described. The configuration of the valve timing adjustment device of the third embodiment is substantially the same as the configuration of the valve timing adjustment device 10 of the first embodiment. In the valve timing adjustment device of the third embodiment, the controller 11 executes the stop processing of FIG. 9 when the operation of the internal combustion engine 500 is stopped. As will be described below, in the valve timing adjustment device of the third embodiment, the startup preparation control is executed during the stop processing. As such, the startup preparation control may be omitted when starting the operation of the internal combustion engine 500.

In step S100, the controller 11 causes the phase adjustment unit 15 to set the relative rotation phase to a predetermined stopping phase. Next, when the operation of the internal combustion engine 500 is stopped, the controller 11 executes startup preparation control for changing the relative rotation phase in step S110 in preparation for the next startup of the internal combustion engine 500. Additionally, in alternative embodiments, the process of step S100 for controlling the relative rotation phase to the stopping phase may be performed after the startup preparation control instead.

Figure 10:
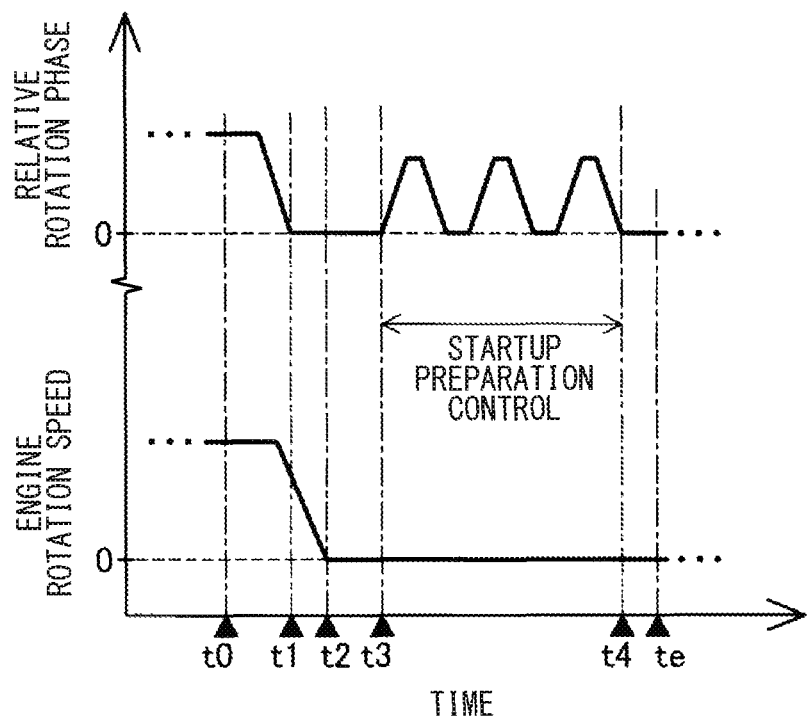
FIG. 10 is an explanatory diagram showing an example of a timing chart when the stop processing of the third embodiment is executed.

In the example of FIG. 10, an operation by the driver that commands the operation of the internal combustion engine 500 to stop is detected at time t0. Then, the relative rotation phase is set to the stopping phase at time t1. After that, the operation of the internal combustion engine 500 is stopped at time t2. In this example, the stopping phase is the most-retarded angle. In the subsequent period from time t3 to t4, the startup preparation control is executed. The startup preparation control of the third embodiment is executed in the same manner as described in the first embodiment.

According to the valve timing device of the third embodiment, when the operation of the internal combustion engine 500 is stopped, the temperature of the lubricating oil is still relatively high due to the prior operation of the internal combustion engine 500. Therefore, at this time, the viscosity resistance inside the phase adjustment unit 15 is expected to be relatively low. The startup preparation control is executed in this state. As a result, the lubricating oil can be efficiently discharged from the phase adjustment unit 15 by the startup preparation control. Thus, when the internal combustion engine 500 is subsequently started up at a later time, the amount of lubricating oil inside the phase adjustment unit 15 is reduced and the viscosity resistance inside the phase adjustment unit 15 is reduced. Further, since the startup preparation control can be omitted when the internal combustion engine 500 is started, the amount of time required to start the internal combustion engine 500 can be reduced. In addition, according to the valve timing adjustment device and the control method thereof of the third embodiment, various functions and effects similar to those described in the first embodiment can be achieved.

4. Fourth Embodiment

Figure 11:
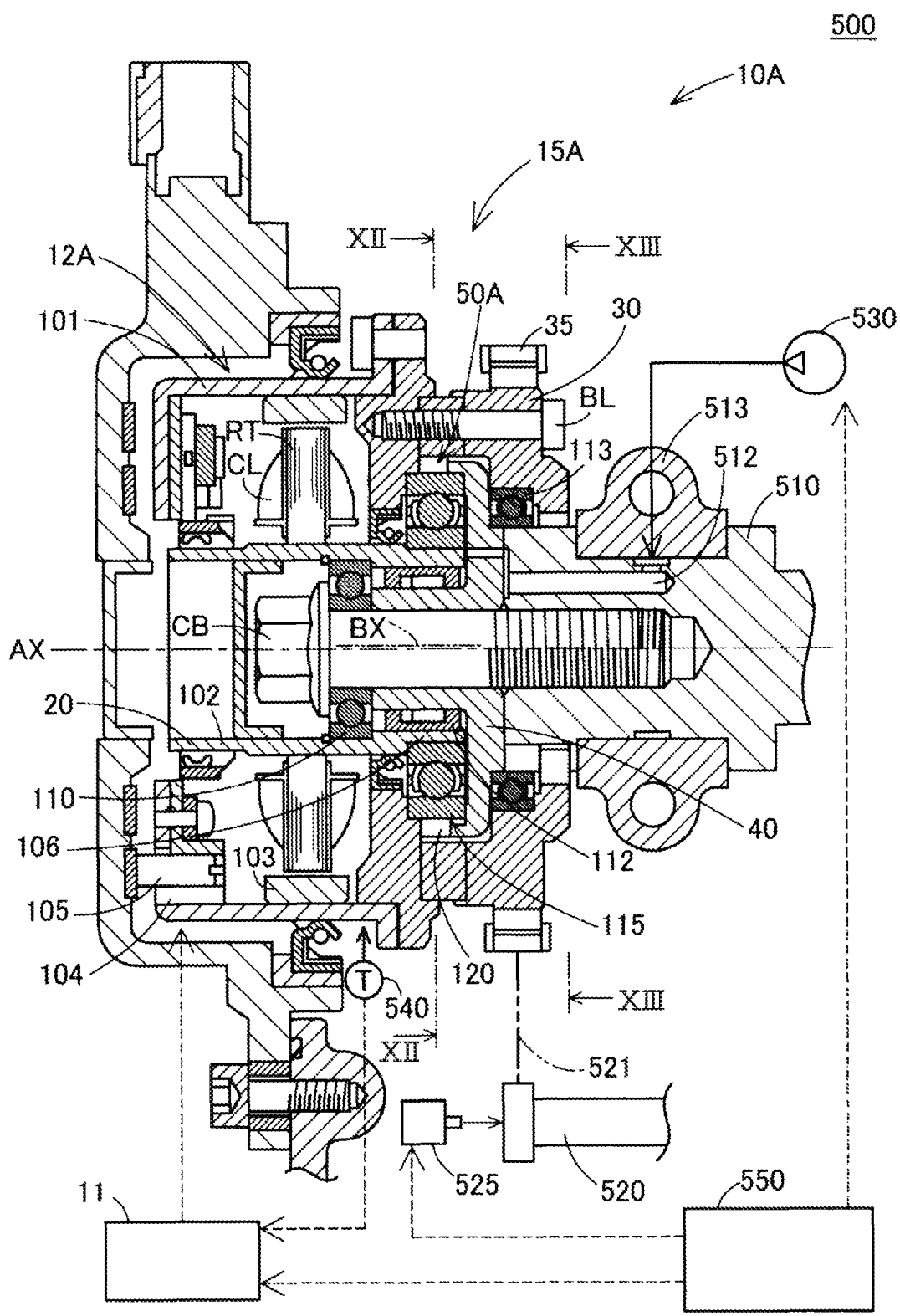
FIG. 11 is a schematic cross-sectional view showing a configuration of a valve timing adjustment device according to a fourth embodiment.
Figure 12:
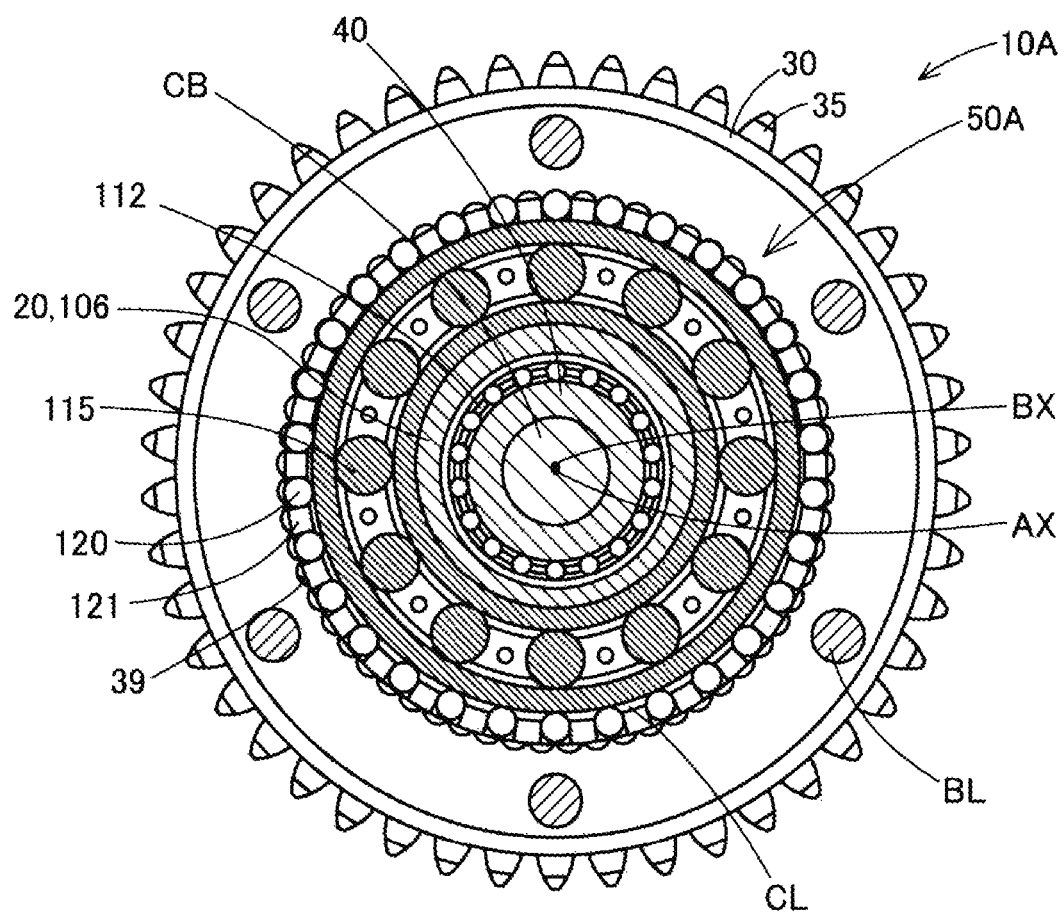
FIG. 12 is a schematic cross-sectional view of a phase adjustment unit taken along line 12-12 shown in FIG. 11.
Figure 13:
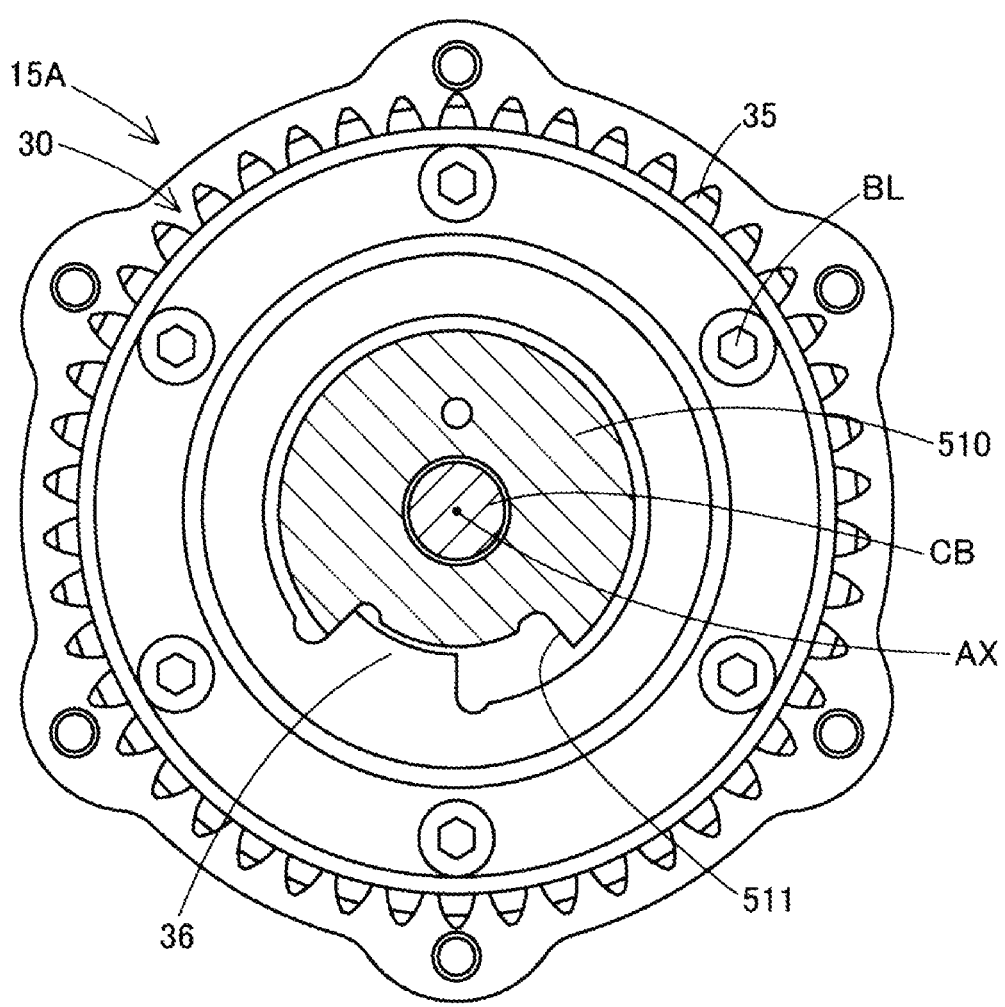
FIG. 13 is a schematic cross-sectional view of a phase adjustment unit taken along line 13-13 shown in FIG. 11.

The structure of a valve timing adjustment device 10A of a fourth embodiment will be described with reference to FIG. 11, FIG. 12, and FIG. 13. Aside from the differences described below, the configuration of the valve timing adjustment device 10A of the fourth embodiment is substantially the same as the configuration of the valve timing adjustment device 10 of the first embodiment. In FIGS. 11 to 13, components having the same reference numerals as those described in the first embodiment have the same functions as those described in the first embodiment even if the illustrated shapes are different.

Referring to FIG. 11, the valve timing adjustment device 10A includes a phase adjustment unit 15A of the fourth embodiment instead of the phase adjustment unit 15 described in the first embodiment. Further, the valve timing adjustment device 10A includes an actuator 12A that is disposed inside the phase adjustment unit 15A and integrated with the phase adjustment unit 15A, instead of the actuator 12 of the first embodiment.

The actuator 12A is formed by a brushed DC motor. The actuator 12A includes a housing 101 which is a yoke that rotates integrally with the sprocket 35, a motor output shaft 102 that is rotatably provided inside the housing 101, a pair of permanent magnets 103 fixed to the inner peripheral surface of the housing 101, a stator 104 which is a fixed member, and a brush 105a. The permanent magnets 103 have a semicircular arc shape.

The motor output shaft 102 has a cylindrical shape. A rotor RT is fixed to the outer surface of the motor output shaft 102. In addition, an electromagnetic coil CL is wound around the rotor RT. The rotation axis of the motor output shaft 102 coincides with the rotation axis AX of the camshaft 510. The cylinder of the motor output shaft 102 accommodates a center bolt CB fastened to the camshaft 510. The motor output shaft 102 is rotatably supported by a bearing 110 and a needle bearing 112 provided on the outer periphery of the center bolt CB. In the fourth embodiment, the motor output shaft 102 is integrated with the input rotator 20 of the phase adjustment unit 15.

Next, referring to FIGS. 11 and 12, an eccentric shaft portion 106 is integrally provided at the end portion of the motor output shaft 102 facing the camshaft 510. The eccentric shaft portion 106 is a cylindrical eccentric rotator that forms a part of a speed reduction mechanism 50A. As shown in FIG. 11, the eccentric shaft portion 106 is formed in a cylindrical shape. The axial center of the eccentric shaft portion 106 is an eccentric axial center BX, which is slightly offset from the rotation axis AX in the radial direction as shown in FIGS. 11 and 12.

Referring to FIG. 11, in the valve timing adjustment device 10A, the driving rotator 30 with the sprocket 35 is supported by the camshaft 510. Specifically, the driving rotator 30 is rotatable relative to the camshaft 510 via a bearing 113 provided on the outer periphery of the camshaft 510.

Referring to FIG. 13, a stopper groove 511 is provided on the outer peripheral surface of the camshaft 510. The stopper groove 511 is formed in an arc shape with a predetermined length along the rotation direction of the camshaft 510. The length of the stopper groove 511 defines the most-retarded angle and the most-advanced angle of the relative rotation phase between the driving rotator 30 and the driven rotator 40. In the valve timing adjustment device 10A, when the engaging portion 36, which is a protrusion provided on the inner peripheral surface of the driving rotator 30, abuts against either end portion of the stopper groove 511, the relative rotation phase is at the most-retarded angle or the most-advanced angle.

The valve timing adjustment device 10A includes the speed reduction mechanism 50A instead of the speed reduction mechanism 50 described in the first embodiment. In particular, the speed reduction mechanism 50A is a roller mechanism having a plurality of rollers 120, instead of being a planetary gear mechanism as in the first embodiment.

The structure of the speed reduction mechanism 50A will be described with reference to FIG. 12. In the valve timing adjustment device 10A, the center bolt CB passes through the center of the driven rotator 40. The needle bearing 112 that supports the input rotator 20 described above is provided on the outer periphery of the driven rotator 40. The needle bearing 112 supports the eccentric shaft portion 106 of the input rotator 20. A ball bearing 115 is provided on the outer periphery of the eccentric shaft portion 106. On the outer periphery of the ball bearing 115, the plurality of rollers 120 constituting the speed reduction mechanism 50A are arranged at equal intervals over the entire circumference. Each roller 120 is interposed between a plurality of retainers 121 provided integrally with the driven rotator 40. The rollers 120 are retained in a state in which movement in the radial direction is permitted. Each roller 120 faces the inner peripheral surface of the driving rotator 30. Recesses 39 are formed over the entire circumference on the inner circumferential surface of the driving rotator 30. The rollers 120 can be partially fit inside the recesses 39.

The ball bearing 115 is disposed so as to be substantially overlapping in the radial position with the needle bearing 112. The rollers 120 are constantly in contact with the outer peripheral surface of the ball bearing 115. As shown in FIG. 12, a crescent shaped gap is formed on the outer peripheral side of the ball bearing 115. This crescent shaped gap allows the entire ball bearing 115 to move in the radial direction in accordance with the eccentric rotation of the eccentric shaft portion 106. In other words, the ball bearing 115 is capable of eccentric movement. In this regard, in the speed reduction mechanism 50A, the ball bearing 115 and the eccentric shaft portion 106 are collectively referred to as an eccentric rotator. Further, in accordance with the eccentric movement of the ball bearing 115, the rollers 120 are moved back and forth in the radial direction while being guided by the retainers 121.

In the valve timing adjustment device 10A, the eccentric shaft portion 106 rotates eccentrically in accordance with the rotation of the motor output shaft 102. When this happens, the rollers 120 are guided by the retainers 121 during each rotation of the motor output shaft 102. Specifically, as the motor output shaft 102 rotates, each roller 120 is guided to roll over each recess 39 of the driving rotator 30 and roll into an adjacent recess 39. the driving rotator 30 and rolls to another adjacent recess 39 while moving along the circumferential direction. The rotation speed of the motor output shaft 102 is reduced by the movement of each roller 120, and this rotational force is transmitted to the camshaft 510 via the driven rotator 40.

In the valve timing adjustment device 10A, the relative rotation phase between the crankshaft 520 and the camshaft 510 is controlled by forward and reverse rotation control of the motor output shaft 102 by the controller 11. When the driven rotator 40 rotates in the same direction as the rotation direction of the driving rotator 30, the relative rotation phase is changed to the advance side. Conversely, when the driven rotator 40 rotates in the opposite direction as the rotation direction of the driving rotator 30, the relative rotation phase is changed to the retard side.

In the valve timing adjustment device 10A of the fourth embodiment as well, the controller ibis configured to reduce the amount of lubricating oil inside the phase adjustment unit 15 when the internal combustion engine 500 is started by performing the startup processing including the startup preparation control, as described in the first embodiment. As a result, when the operation of the internal combustion engine 500 is started, the viscosity resistance in the phase adjustment unit 15 may be reduced, especially during cold starts. As a result, the operation responsiveness of the valve timing adjustment device 10A may be improved. In the startup preparation control of the valve timing adjustment device 10A, the retard angle operation and the advance angle operation are preferably performed so that the eccentric axis BX makes at least one full revolution around the rotation axis AX. As a result of doing this, the lubricating oil can be discharged from the crescent shaped gap on the outer peripheral side of the ball bearing 115, and the viscosity resistance in the speed reduction mechanism 50A can be effectively reduced. In addition, according to the valve timing adjustment device 10A and the control method thereof of the fourth embodiment, various functions and effects similar to those described in the first embodiment can be achieved.

5. Other Embodiments

The various configurations described in the above embodiments can be modified as follows, for example. The various embodiments described below are intended to be exemplary implementations of the technology described in this disclosure, similar to the embodiments described above.

Modified Embodiment 1

In the startup processing of each of the above embodiments, the processes of steps S10 and S20 may be omitted. In other words, the controller 11 may execute the startup preparation control in the startup processing regardless of the temperature of the valve timing adjustment devices 10 and 10A.

Modified Embodiment 2

In the startup processing, the controller 11 may execute the startup preparation control both before the start of the crank operation and during the execution of the crank operation. Further, the controller 11 may execute the startup preparation control while the internal combustion engine 500 is stopped as well. For example, when the internal combustion engine 500 is stopped, the controller 11 may periodically start up, check the outside air temperature. Then when the controller 11 detects that the outside air temperature has dropped below the predetermined threshold value, the controller 11 may perform the startup preparation control in anticipation of the next time that the internal combustion engine 500 is started.

Modified Embodiment 3

In the valve timing adjustment device 10A of the fourth embodiment, the startup processing described in the second embodiment and the stop processing described in the third embodiment may be performed instead of the startup processing described in the first embodiment. In this case, according to the valve timing adjustment device 10A of the fourth embodiment, the various functions and effects similar to those described in the second and third embodiments can be achieved as well.

Modified Embodiment 4

In each of the embodiments described above, the phase adjustment units 15 and 15A are not necessarily filled with lubricating oil after operation is stopped. Even in this case, if the phase adjustment units 15 and 15A are driven by the startup preparation control, performance of starting the internal combustion engine 500 may nevertheless be improved due to, for example, reducing sticking between the rotators in the phase adjustment units 15 and 15A. Therefore, it is possible improve the operation responsiveness of the valve timing adjustment devices 10 and 10A.

Modified Embodiment 5

In each of the embodiments described above, the speed reduction mechanisms 50 and 50A may be other types of planetary gear mechanisms, or may be other types of roller speed reduction mechanisms.

6. Other Modifications

The technology of the present disclosure is not limited to valve timing adjustment devices, and can be implemented in various forms aside from valve timing adjustment devices. The technology of the present disclosure may be applied to, for example, a control device or control method of a valve timing adjustment device, an internal combustion engine system including the valve timing adjustment device, a vehicle including the internal combustion engine, a starting method of the internal combustion engine, a stopping method of the internal combustion engine, and so on. In addition, the technology described herein can be implemented in the form of a computer program for executing the above described control method, a storage medium on which this computer program is recorded, and so on.

The technology of the present disclosure should not be limited to the embodiments described above or the modifications described above, and various other embodiments may be implemented without departing from the scope of the present disclosure. For example, the technical features in the embodiments can be replaced or combined as appropriate. In addition, any technical features which are not explicitly described as being essential may be omitted where appropriate.

The invention claimed is:

1. A valve timing adjustment device for an internal combustion engine that adjusts opening and closing timings of a valve which is opened and closed by a camshaft driven by torque transmitted from a crankshaft, the valve timing adjustment device comprising:
    a phase adjustment unit including
        an input rotator,
        a driving rotator that rotates in conjunction with the crankshaft,
        a driven rotator that rotates in conjunction with the camshaft, and
        a speed reduction mechanism that connects each of the driving rotator and the driven rotator to the input rotator so as to be rotatable relative to the input rotator, the speed reduction mechanism being configured to change a relative rotation phase between the driving rotator and the driven rotator in accordance with a rotation of the input rotator;

an actuator configured to rotate the input rotator; and a controller that controls rotation of the actuator to control the relative rotation phase, wherein the controller is configured to, within a single start/stop cycle of the internal combustion engine:

perform a startup phase control when operation of the internal combustion engine is started, the startup phase control including setting the relative rotation phase to a predetermined initial phase, and perform a startup preparation control during a period after the internal combustion engine is stopped and before the startup phase control is performed, the startup preparation control including changing the relative rotation phase.

2. The valve timing adjustment device according to claim 1, wherein the startup preparation control is performed after a command to start the internal combustion is received and before a cranking operation of the internal combustion engine is started.

3. The valve timing adjustment device according to claim 1, wherein the startup preparation control is performed during a cranking operation of the internal combustion engine after a command to start the internal combustion is received.

4. The valve timing adjustment device according to claim 2, further comprising:

a temperature detection unit that detects a temperature of the valve timing adjustment device, wherein the controller is configured to perform the startup preparation control when a detected temperature detected by the temperature detection unit is lower than a predetermined temperature.

5. The valve timing adjustment device according to claim 1, wherein the startup preparation control is performed during a period after the internal combustion is stopped and before a command to start the internal combustion engine is received.

6. The valve timing adjustment device according to claim 1, wherein the startup preparation control includes an advance angle operation that advances the relative rotation phase and a retard angle operation that retards the relative rotation phase.

7. The valve timing adjustment device according to claim 6, wherein the startup preparation control includes alternately performing the advance angle operation followed by the retard angle operation a plurality of times, or repeatedly performing the retard angle operation followed by the advance angle operation a plurality of times.

8. The valve timing adjustment device according to claim 1, wherein the speed reduction mechanism includes a planetary gear that performs planetary motion in response to the rotation the input rotator, and the startup preparation control includes operating the planetary gear at perform at least one full revolution.

9. The valve timing adjustment device according to claim 1, wherein the speed reduction mechanism is a roller mechanism including a plurality of rollers configured to rotate to reduce the rotation speed of the input rotator.

10. A control device for a valve timing adjustment device of an internal combustion engine that adjusts opening and closing timings of a valve which is opened and closed by a camshaft driven by torque transmitted from a crankshaft, the valve timing adjustment device including a phase adjustment unit including an input rotator, a driving rotator that rotates in conjunction with the crankshaft, a driven rotator that rotates in conjunction with the camshaft, and a speed reduction mechanism that connects each of the driving rotator and the driven rotator to the input rotator so as to be rotatable relative to the input rotator, the speed reduction mechanism being configured to change a relative rotation phase between the driving rotator and the driven rotator in accordance with a rotation of the input rotator, and an actuator configured to rotate the input rotator, wherein the control device is configured to, within a single star/stop cycle of the internal combustion engine;

perform a startup phase control when operation of the internal combustion engine is started, the startup phase control including controlling the relative rotation phase to a predetermined initial phase, and perform a startup preparation control during a period after the internal combustion engine is stopped and before the startup phase control being performed, the startup preparation control including changing the relative rotation phase.

11. A control method of a valve timing adjustment device for an internal combustion engine that adjusts opening and closing timings of a valve which is opened and closed by a camshaft driven by torque transmitted from a crankshaft, the method comprising:

within a single star/stop cycle of the internal combustion engine:

performing a startup phase control when operation of the internal combustion engine is started, the startup phase control including setting a relative rotation phase to a predetermined initial phase, the relative rotation phase being between a driving rotator that rotates in conjunction with the crankshaft and a driven rotator that rotates in conjunction with the camshaft; and performing a startup preparation control during a period after the internal combustion engine is stopped and before the startup phase control being performed, the startup preparation control including changing the relative rotation phase.

* * * * *